(12) United States Patent
MR et al.

(10) Patent No.: US 11,244,556 B2
(45) Date of Patent: Feb. 8, 2022

(54) METHOD, APPARATUS, AND SYSTEM FOR MANAGING ALARMS

(71) Applicants: Ranjan MR, Bangalore (IN); Supriya Murthy, Bangalore (IN); Govindaraju B.V, Bangalore (IN); Debasish Behera, Bangalore (IN); Manivannan K, Bangalore (IN); Pragnyasini Panigrahi, Ganjam (IN); Sapna Vandakar, Shimoga (IN)

(72) Inventors: Ranjan MR, Bangalore (IN); Supriya Murthy, Bangalore (IN); Govindaraju B.V, Bangalore (IN); Debasish Behera, Bangalore (IN); Manivannan K, Bangalore (IN); Pragnyasini Panigrahi, Ganjam (IN); Sapna Vandakar, Shimoga (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/333,331

(22) Filed: May 28, 2021

(65) Prior Publication Data
US 2021/0287523 A1 Sep. 16, 2021

Related U.S. Application Data

(63) Continuation of application No. PCT/EP2019/082712, filed on Nov. 27, 2019.

(30) Foreign Application Priority Data

Nov. 29, 2018 (EP) .................................... 18209215

(51) Int. Cl.
G08B 29/16 (2006.01)
G05B 15/02 (2006.01)
G06F 9/455 (2018.01)

(52) U.S. Cl.
CPC ............. *G08B 29/16* (2013.01); *G05B 15/02* (2013.01); *G06F 9/45558* (2013.01); *G06F 2009/45562* (2013.01)

(58) Field of Classification Search
None
See application file for complete search history.

(56) References Cited

U.S. PATENT DOCUMENTS 6,862,698 B1    3/2005  Shyu
8,223,031 B1 *  7/2012  Allen .................... G01R 29/12
                                              340/662

(Continued)

FOREIGN PATENT DOCUMENTS

EP    1906288 A2      4/2008
EP    2466564 A2 *   6/2012  ............. G08B 29/16

OTHER PUBLICATIONS

International Search Report and Written Opinion for PCT/EP2019/082712, dated Jun. 4, 2020, 9 pages.

(Continued)

*Primary Examiner* — Fekadeselassie Girma
(74) *Attorney, Agent, or Firm* — Lempia Summerfield Katz LLC

(57) ABSTRACT

A method, an apparatus, and a system for managing alarms is provided. In one aspect, the method includes detecting a fault in one of a plurality of alarm systems, wherein each of the alarm systems is configured to generate at least one alarm associated with an event in the technical installation. The method further includes invoking a proxy of the faulty alarm system upon detecting the fault condition, wherein the proxy, when invoked, is configured to perform the functions (Continued)

of the faulty alarm system. Additionally, the method includes processing, by the proxy, event data associated with the event in the technical installation. Furthermore, the method includes generating at least one alarm by the proxy based on the processing of the event in the technical installation and outputting an alarm condition on a device associated with a user of the technical installation.

13 Claims, 6 Drawing Sheets

(56) References Cited

U.S. PATENT DOCUMENTS

| | | | | |
|---|---|---|---|---|
| 8,295,894 | B2* | 10/2012 | Macfarlane | G08B 13/149 |
| | | | | 455/575.1 |
| 8,659,414 | B1* | 2/2014 | Schuk | G08B 21/24 |
| | | | | 340/457 |
| 10,962,999 | B2* | 3/2021 | Meagher | G05F 1/66 |
| 11,037,376 | B2* | 6/2021 | Van de Cotte | G07C 3/12 |
| 2005/0028024 | A1 | 2/2005 | Kataoka | |
| 2007/0192078 | A1 | 8/2007 | Nasle et al. | |
| 2008/0079561 | A1* | 4/2008 | Trundle | G08B 25/002 |
| | | | | 340/506 |
| 2011/0227740 | A1* | 9/2011 | Wohltjen | G01S 11/16 |
| | | | | 340/573.1 |
| 2012/0159237 | A1* | 6/2012 | Skrodzki | G08B 29/16 |
| | | | | 714/5.1 |
| 2014/0047107 | A1* | 2/2014 | Maturana | G05B 19/056 |
| | | | | 709/224 |
| 2014/0333430 | A1* | 11/2014 | Piccolo, III | G08B 25/004 |
| | | | | 340/508 |
| 2015/0127174 | A1* | 5/2015 | Quam | G05B 15/02 |
| | | | | 700/276 |
| 2018/0013270 | A1* | 1/2018 | Jubeck | G01L 1/125 |
| 2019/0207860 | A1* | 7/2019 | York | H04L 43/0876 |

OTHER PUBLICATIONS

International Preliminary Report on Patentability for PCT/EP2019/082712, dated Feb. 26, 2021, with PCT prosecution and claim amendments, 24 pages.

* cited by examiner

100 - Alarm management system
102 - Cloud platform
104 - Apparatus
106A-N - Alarm systems
107 - Technical installation
112 - Alarm management module
114 - Alarm management database
116 - Network interface
118 - Communication links
122A-N - Plurality of devices
128 - Container
130 - Proxy 102 - Cloud platform
112 - Alarm management module
114 - Alarm management database
116 - Network interface
201 - Processing unit
202 - Memory
203 - Storage unit
204 - Bus 104 - Edge computing device
112 - Alarm management module
128 - Container
301 - Proxy 104 - Edge computing device
112 - Alarm management module
128 - Container
130 - Proxy 801 - Fog computing device
112 - Alarm management module
114 - Alarm management database
116 - Network interface
128 - Container
130 - Proxy

METHOD, APPARATUS, AND SYSTEM FOR MANAGING ALARMS

The present patent document is a continuation of PCT Application Serial No. PCT/EP2019/082712, filed Nov. 27, 2019, designating the United States, which is hereby incorporated by reference, and this patent document also claims the benefit of European Patent Application No. 18209215.5, filed Nov. 29, 2018, which is also hereby incorporated by reference.

TECHNICAL FIELD

The present disclosure relates to a method, an apparatus, and a system for managing alarms.

BACKGROUND

A plant may include several machines and devices which are capable of manufacturing goods and products by processing raw materials. These machines and devices may have human machine interaction (HMI) panels enabling workers to interact with the machines. Manufacturing of goods and products using the machines and devices involves several process acts. In order to provide products of a certain quality, the process acts are monitored. Such monitoring of the process efficiency may be performed, for example, by one or more sensors associated with the machines and devices in the plant. The sensors monitor process values at each process act which may be a current measure value of each part involved in the process act. In a scenario where the process values do not meet a pre-defined condition or a threshold, such deviation is notified to the concerned worker in the plant. The critical conditions associated with each process act may be notified to the worker through one or more alarms in the HMI panels in the machines. The alarms enable tracking of the process values and also monitoring of the behavior of the machine and/or device.

Such alarms may be generated by a series of alarm systems which may be associated with the machines and devices. The alarm systems may generate alarms based on a set of conditions defined for a process value. Such conditions may be known as alarm conditions. If the defined conditions are met, the alarm systems are configured to generate alarms to notify the workers of a possible deviation in the process parameters. Currently, there is no redundancy in the alarms systems in the plant. Therefore, if an alarm system fails or is offline, there is no means to monitor the alarm conditions. Furthermore, alarms across different alarm systems in different HMI panels are not handled efficiently.

Therefore, there exists a need for a method and system for management of alarms in a plant which is efficient and accurate.

SUMMARY AND DESCRIPTION

The object of the disclosure is therefore to provide a method and a system for managing alarms in a plant which efficiently handles a plurality of alarms generated by one or more alarm systems and is accurate.

The object of the disclosure is achieved by a method, an apparatus, a system, a computer program product, and a computer readable medium.

Hereinafter, before coming to a detailed description of the embodiments of the disclosure with reference to the attached drawings, some aspects are discussed which contribute to the understanding of the disclosure. However, it should be noted that the disclosure is defined by the attached claims and is not affected to any degree by the statements within this summary. Any examples and aspects not covered under the claims are also to be understood to be simply aspects which contribute to the understanding of the disclosure. The present embodiments may obviate one or more of the drawbacks or limitations in the related art.

The disclosure according to one aspect relates to a method of managing alarms. The method includes detecting by an apparatus a fault condition associated with one of a plurality of alarm systems in the technical installation. Each of the alarm systems may be configured to generate at least one alarm associated with an event in the technical installation. In an embodiment, the alarm system may be non-functional due to a fault. The fault condition may be the unavailability of or disconnection from a network, wherein the network is needed for the functioning of the alarm system. Alternatively, the alarm system may be faulty if the device associated with the alarm system malfunctions. The method further includes invoking a proxy of the faulty alarm system upon detecting the fault condition. The proxy, when invoked, may be configured to perform the functions associated with the faulty alarm system. A proxy may be an object which when executed performs a defined operation. The proxy may virtualize a target object. In an embodiment, the proxy may be in the apparatus and may be invoked when a fault condition is identified in alarm system of the plurality of the alarm systems. The method further includes processing by the proxy, event data associated with the event in the technical installation. The event data associated with the event may be processed to determine if one or more alarm conditions are met for generation of alarms. The event data may be parameter values associated with one or more parameters that may form a part of the detected event. The parameters may be temperature, pressure, fluid level, etc. The alarm conditions may be one or more conditions that are required to be fulfilled for an alarm to be generated. For example, each parameter value associated with the detected event may have a pre-defined threshold value. If the parameter values deviate from the pre-defined threshold value, the alarm condition may be met. The method further includes generating at least one alarm by the proxy based on the processing of the event in the technical installation. In an embodiment, if the alarm conditions are identified to be met, at least one alarm may be generated in the technical installation by the proxy. Such alarm may be a visual indication in the form of a notification. Alternatively, the alarm may also be sound based. The method further includes outputting the alarm condition on a device associated with a user of the technical installation. Outputting the alarm condition on the device associated with the user enables timely intimation to the user of the fault condition in the technical installation. Therefore, catastrophic damage to the technical installation is prevented even when the alarm system is faulty.

According to an embodiment, invoking the proxy of the faulty alarm system includes creating an instance of a virtual alarm system using the proxy, when a fault condition is detected. The method further includes configuring the instance of the virtual alarm system by executing a container object including configuration data associated with the faulty alarm system. In an embodiment, the proxy is the virtual alarm system. The virtual alarm system may be capable of performing the functions of one or more alarm systems using the configuration data associated with such one or more alarm systems. Advantageously, the virtual alarm system enables generation of alarms for one or more devices if the associated alarm system is identified as faulty.

A container is a lightweight, stand-alone, executable package of applications which may be deployed and executed virtually on a host device. In an embodiment, the host device is the apparatus. The container may include objects such as files, environment variables, and libraries for the applications to be executed. The container may be deployed on the apparatus, for example, from a server or a cloud platform. The container associated with the faulty alarm system may include the alarm conditions for the one or more devices associated with the faulty alarm system. Executing the container associated with the faulty alarm system provides alarm conditions associated with the faulty alarm system to the virtual alarm system. The virtual alarm system may generate the alarm for the one or more devices associated with the faulty alarm system. Advantageously, the alarm conditions of the one or more devices associated with the faulty alarm system are monitored efficiently. The disclosure enables generation of an alarm for the one or more devices associated with the faulty alarm system even when the fault is identified in the faulty alarm system. Therefore, the overall safety and efficiency of the technical installation is maintained.

According to an embodiment, processing the event data associated with the event in the technical installation includes determining one or more alarm conditions of the one or more devices associated with the faulty alarm system. Alternatively, the alarm conditions associated with the faulty alarm system may be obtained from the server or cloud environment. The method includes receiving, from one or more sensors, one or more parameter values associated with the one or more devices. The sensors are configured to capture and provide real-time parameter values associated with the one or more devices to the virtual alarm system. The real-time parameter values may be compared with the corresponding pre-defined threshold values to identify a deviation. The method further includes determining if the alarm conditions are met for generation of alarm based on the received parameter values. If a deviation is identified, the alarm conditions may be met. A deviation may be identified to exist if a difference between the real-time parameter values and the pre-defined threshold value is established. The method further includes generating by the virtual alarm system, the at least one alarm if the alarm conditions are met. For example, if the given parameter is temperature which has a pre-requisite requirement of maintenance of less than 100 degree Celsius, the pre-defined threshold value is identified as 100 degree Celsius. Therefore, the alarm condition may be defined such that an alarm is generated if the temperature increases above 100 degree Celsius. Therefore, if the temperature of the device increases above 100 degree Celsius, an alarm may be generated. Generation of the alarm for the one or more devices associated with the faulty alarm system enables efficient monitoring and maintenance of the one or more devices in spite of the fault condition in the alarm system. The virtual alarm system therefore enables maintenance of redundancy of alarm systems in the technical installation.

According to an embodiment, detecting the fault in an alarm system of the plurality of the alarm systems includes identifying an event of absence of notification from the alarm system of the plurality of alarm systems when a first pre-defined interval is lapsed. The alarm system of the plurality of alarm systems may be configured to generate a notification and transmit the generated notification to the apparatus at pre-defined intervals of time. The apparatus may monitor the alarms generated by the plurality of the alarm systems. The notifications generated by the alarm system of the plurality of alarm systems enable the apparatus to monitor the efficient functioning of the alarm systems. The method further includes identifying an event of absence of notification from the one or more devices associated with the alarm system of the plurality of alarm systems when a second pre-defined interval is lapsed. In the event of absence of notification after the lapse of the first pre-defined interval, the apparatus is configured to wait for a second pre-defined interval to receive a notification from the one or more devices associated with the alarm system of the plurality of the alarm systems. The failure of the one or more devices to transmit the notification before the second pre-defined interval lapses may be identified as a fault in the alarm system of the plurality of the alarm systems.

In another aspect, a method of managing alarms in a technical installation is disclosed. The method includes determining a fault in one of a plurality of alarm systems. Such alarm system may be configured to generate an alarm for one or more associated devices. In an embodiment, the alarm system of the plurality of the alarm systems is configured to generate an alarm for the one or more associated devices when one or more alarm conditions are met. Such alarm conditions are associated with the one or more devices and determine when an alarm has to be generated. The method further includes identifying an alternative alarm system based on one or more parameters associated with the alarm systems. The one or more parameters may be the availability of the one or more alarm systems and a bandwidth capacity of the one or more alarm systems to accommodate the alarm conditions of the first alarm system. The method further includes generating an alarm by the alternative alarm system for the one or more devices. The alternative alarm system may be capable of generating an alarm for the one or more devices if the alarm conditions are met. Advantageously, any deviation in the functioning of the one or more devices is not overlooked due to the faulty alarm system. Yet another advantage is that a redundancy in the alarm system is introduced due to which even if one alarm system malfunctions, the alternative alarm system handles the alarm generation.

According to an embodiment, in identifying the alternative alarm system based on the one or more parameters, the method includes broadcasting a buffer time period associated with each of the alarm conditions of the faulty alarm system to the plurality of the alarm systems. The broadcasted buffer time period associated with each of the alarm conditions are received by the plurality of the alarm systems. In an embodiment, one or more alarm systems may be identified based on one or more configurations of the first alarm system, before the buffer time period is broadcasted. An alarm is triggered based on the one or more configurations. The configurations describe a process value in a controlling unit that is to be monitored for a defined condition. When the condition is met, the alarm is generated. The controlling unit may be connected to other alarm systems which may be identified as the alternative alarm system. Therefore, the alternative alarm system may be determined efficiently such that the alarm conditions for the one or more devices associated with the faulty alarm system may be managed methodically. The method further includes determining by the plurality of the alarm systems if the buffer time period may be accommodated within a pre-defined alarm bandwidth. The broadcasted buffer time period is analyzed by the plurality of the alarm systems to identify if the buffer time period may be accommodated. Such identification may be performed based on, for example, the available slots in the one or more alarms systems to accommodate the broadcasted buffer time period. The pre-defined alarm bandwidth may depend on the primary alarm conditions associated with the respective alarm systems. The method further includes receiving from the one or more alarm systems of the plurality of the alarm systems an acknowledgement of accommodation of the broadcasted buffer time period. An advantage of the disclosure is that the one or more alarm systems capable of accommodating the alarm conditions associated with the faulty alarm system are identified efficiently. Therefore, the alarm conditions of the faulty alarm system are handled efficiently.

The disclosure also relates to an apparatus for managing alarms. The apparatus includes one or more processing units, and a memory coupled to the processing units. The memory may include an alarm management database, an alarm management module and a proxy. The alarm management module may be configured to detect a fault condition associated with one of a plurality of alarm systems in the technical installation. Each of the alarm systems may be configured to generate at least one alarm associated with an event in the technical installation. In an embodiment, the alarm system may be non-functional due to a fault. The fault condition may be the unavailability of or disconnection from a network, wherein the network is provided for the functioning of the alarm system. Alternatively, the alarm system may be faulty if the device associated with the alarm system malfunctions. The alarm management module is further configured to invoke the proxy of the faulty alarm system upon detecting the fault condition. The proxy, when invoked, may be configured to perform the functions associated with the faulty alarm system. A proxy may be an object which when executed performs a defined operation. The proxy may virtualize a target object. In an embodiment, when invoked, the proxy configures a virtual alarm system to generate an alarm for the one or more devices associated with the faulty alarm system. The proxy is further configured to process event data associated with the event in the technical installation. The event data associated with the event may be processed to determine if one or more alarm conditions are met for generation of alarms. The event data may be parameter values associated with one or more parameters that may form a part of the detected event. The parameters may be temperature, pressure, fluid level, etc. The alarm conditions may be one or more conditions that are required to be fulfilled for an alarm to be generated. For example, each parameter value associated with the detected event may have a pre-defined threshold value. If the parameter values deviate from the pre-defined threshold value, the alarm condition may be met. The invoked proxy is further configured to generate at least one alarm based on the processing of the event in the technical installation. In an embodiment, if the alarm conditions are identified to be met, at least one alarm may be generated in the technical installation by the proxy. Such alarm may be a visual indication in the form of a notification. Alternatively, the alarm may also be sound based. The alarm management module is further configured to output the alarm condition on a device associated with a user of the technical installation. Outputting the alarm condition on the device associated with the user enables timely intimation to the user of the fault condition in the technical installation. Therefore, catastrophic damage to the technical installation is prevented even when the alarm system is faulty.

According to an embodiment, in invoking the proxy of the faulty alarm system, the alarm management module is configured to create an instance of a virtual alarm system using the proxy, when a fault condition is detected. The alarm management module is further configured to configure the instance of the virtual alarm system by executing a container object including configuration data associated with the faulty alarm system. In an embodiment, the proxy is the virtual alarm system. The virtual alarm system may be capable of performing the functions of one or more alarm systems using the configuration data associated with such one or more alarm systems. Advantageously, the virtual alarm system enables generation of alarms for one or more devices if the associated alarm system is identified as faulty. A container is a lightweight, stand-alone, executable package of applications which may be deployed and executed virtually on a host device. In an embodiment, the host device is the apparatus. The container may include objects such as files, environment variables, and libraries for the applications to be executed. The container may be deployed on the apparatus, for example, from a server or a cloud platform. The container associated with the faulty alarm system may include the alarm conditions for the one or more devices associated with the faulty alarm system. Executing the container associated with the faulty alarm system provides alarm conditions associated with the faulty alarm system to the virtual alarm system. The virtual alarm system may generate the alarm for the one or more devices associated with the faulty alarm system. Advantageously, the alarm conditions of the one or more devices associated with the faulty alarm system are monitored efficiently. The disclosure enables generation of an alarm for the one or more devices associated with the faulty alarm system even when the fault is identified in the faulty alarm system. Therefore, the overall safety and efficiency of the technical installation is maintained.

According to an embodiment, in processing the event data associated with the event in the technical installation, the proxy is configured to determine the one or more alarm conditions of the one or more devices associated with the faulty alarm system. Alternatively, the alarm conditions associated with the faulty alarm system may be obtained from the server or cloud environment. The proxy is configured to receive from one or more sensors, one or more parameter values associated with the one or more devices. The sensors are configured to capture and provide real-time parameter values associated with the one or more devices to the virtual alarm system. The real-time parameter values may be compared with the corresponding pre-defined threshold values to identify a deviation. The proxy is further configured to determine if the alarm conditions are met for generation of alarm based on the received parameter values. If a deviation is identified, the alarm conditions may be met. A deviation may be identified to exist if a difference between the real-time parameter values and the pre-defined threshold value is established. The proxy is further configured to generate by the virtual alarm system, the at least one alarm if the alarm conditions are met. For example, if the given parameter is temperature which has a pre-requisite requirement of maintenance of less than 100 degree Celsius, the pre-defined threshold value is identified as 100 degree Celsius. Therefore, the alarm condition may be defined such that an alarm is generated if the temperature increases above 100 degree Celsius. Therefore, if the temperature of the device increases above 100 degree Celsius, an alarm may be generated. Generation of the alarm for the one or more device associated with the faulty alarm system enables efficient monitoring and maintenance of the one or more devices in spite of the fault condition in the alarm system. The virtual alarm system therefore enables maintenance of redundancy of alarm systems in the technical installation.

According to an embodiment, in detecting the fault in an alarm system of the plurality of the alarm systems, the alarm management module is configured to identify an event of absence of notification from the alarm system of the plurality of the alarm systems when a first pre-defined interval is lapsed. The alarm system of the plurality of alarm systems may be configured to generate a notification and transmit the generated notification to the apparatus at pre-defined intervals of time. The apparatus may monitor the alarms generated by the plurality of the alarm systems. The notifications generated by the alarm system of the plurality of alarm systems enable the apparatus to monitor the efficient functioning of the alarm systems. The alarm management module is further configured to identify an event of absence of notification from the one or more devices associated with the alarm system of the plurality of alarm systems when a second pre-defined interval is lapsed. In the event of absence of notification after the lapse of the first pre-defined interval, the apparatus is configured to wait for a second pre-defined interval to receive a notification from the one or more devices associated with the alarm system of the plurality of the alarm systems. The failure of the one or more devices to transmit the notification before the second pre-defined interval lapses may be identified as a fault in the alarm system of the plurality of the alarm systems.

In another aspect, the disclosure also relates to an apparatus for managing alarms in a technical installation. The apparatus includes one or more processing units and a memory coupled to the processing units. The memory may include an alarm management module and an alarm database. The alarm management module is further configured to determine a fault in an alarm system of a plurality of alarm systems. Such alarm system may be configured to generate an alarm for one or more associated devices. In an embodiment, the alarm system of the plurality of the alarm systems is configured to generate an alarm for the one or more associated devices when one or more alarm conditions are met. Such alarm conditions are associated with the one or more devices and determine when an alarm has to be generated. The method further includes identifying an alternative alarm system based on one or more parameters associated with the alarm systems. The one or more parameters may be the availability of the one or more alarm systems and a bandwidth capacity of the one or more alarm systems to accommodate the alarm conditions of the first alarm system. The alarm management module is further configured to generate an alarm by the alternative alarm system for the one or more devices. The alternative alarm system may be capable of generating an alarm for the one or more devices if the alarm conditions are met. Advantageously, any deviation in the functioning of the one or more devices is not overlooked due to the faulty first alarm system. Yet another advantage of the disclosure is that a redundancy in the alarm system is introduced due to which even if one alarm system malfunctions, the alternative alarm system handles the alarm generation.

According to an embodiment, in determining the alternative alarm system based on one or more parameters, the alarm management module is configured to broadcast a buffer time period associated with each of the alarm conditions of the faulty alarm system to the plurality of the alarm systems. The broadcasted buffer time period associated with each of the alarm conditions are received by the plurality of the alarm systems. In an embodiment, one or more alarm systems may be identified based on one or more configurations of the faulty alarm system, before the buffer time period is broadcasted. An alarm is triggered based on the configurations. The configurations describe a process value in a controlling unit that is to be monitored for a defined condition. When the condition is met, the alarm is generated. The controlling unit may be connected to other alarm systems which may be identified as the alternative alarm system. Therefore, the alternative alarm system may be determined efficiently such that the alarm conditions for the one or more devices associated with the faulty alarm system may be managed methodically. The alarm management module is further configured to determine if the buffer time period may be accommodated by the plurality of the alarm systems within the corresponding pre-defined alarm bandwidth. The broadcasted buffer time period is analyzed by the plurality of the alarm systems to identify if the buffer time period may be accommodated. Such identification may be performed based on, for example, the available slots in the one or more alarms systems to accommodate the broadcasted buffer time period. The pre-defined alarm bandwidth may depend on the primary alarm conditions associated with the respective alarm systems. The alarm management module is further configured to receive from the one or more alarm systems of the plurality of the alarm systems an acknowledgement of accommodation of the broadcasted buffer time period and determining the alternative alarm system based on the acknowledgement. An advantage of the disclosure is that the one or more alarm systems capable of accommodating the alarm conditions associated with the faulty alarm system are identified efficiently. Therefore, the alarm conditions of the faulty alarm system are handled efficiently.

According to an embodiment, the apparatus may be a cloud computing device, an edge computing device, or a fog computing device.

The disclosure relates in one aspect to a system for managing alarms. The system includes an apparatus, one or more alarm systems communicatively coupled to the apparatus, one or more devices associated with the one or more alarm systems, one or more sensors associated with the one or more devices communicatively coupled to the apparatus, and one or more user devices communicatively coupled to the apparatus.

The disclosure relates in one aspect to a computer program product including a computer program, wherein the computer program is configured to be loaded into a storage unit of a system. The computer program includes program code sections to make the system execute the method according to an aspect of the disclosure when the computer program is executed in the system.

The disclosure relates in one aspect to a computer-readable medium, on which program code sections of a computer program are saved, the program code sections being loadable into and/or executable in a system to make the system execute the method according to an aspect of the disclosure when the program code sections are executed in the system.

The realization of the disclosure by a computer program product and/or a computer-readable medium has the advantage that already existing alarm management systems may be easily adopted by software updates in order to work as proposed by the disclosure.

The computer program product may be a computer program or include another element apart from the computer program. This other element may be hardware, (e.g., a memory device), on which the computer program is stored, a hardware key for using the computer program, and the like, and/or software, (e.g., a documentation or a software key for using the computer program).

BRIEF DESCRIPTION OF THE DRAWINGS

The present disclosure is further described hereinafter with reference to illustrated embodiments shown in the accompanying drawings, in which.

DETAILED DESCRIPTION

Figure 1:
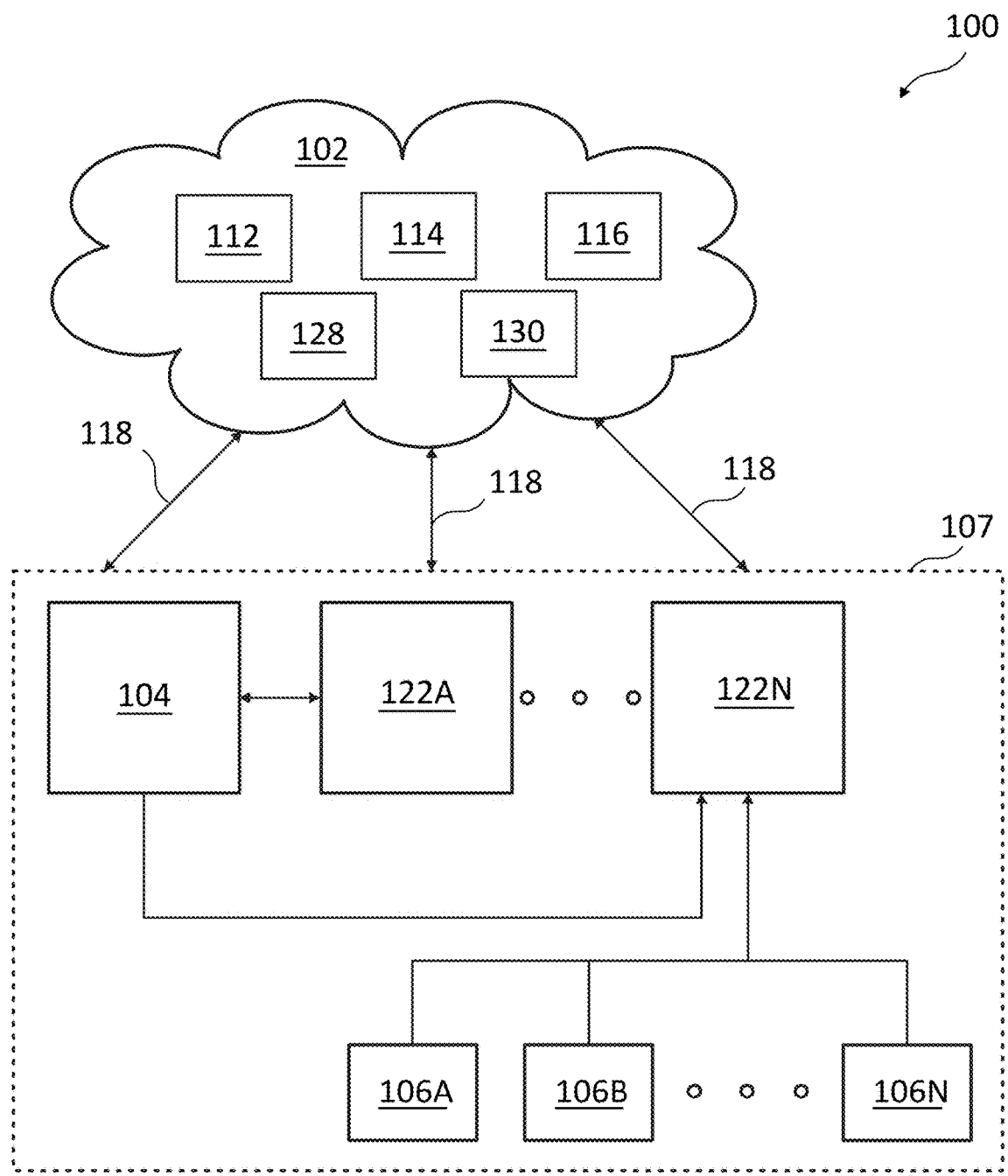
FIG. 1 is a schematic representation of an alarm management, according to an embodiment.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 is a schematic representation of an alarm management system 100, according to a first embodiment. The alarm management system 100 includes a cloud platform 102, an apparatus 104 connected to the cloud platform 102, one or more alarm systems 106A-N, and a plurality of devices 122A-N connected to the alarm systems 106A-N. The apparatus 104 is a cloud computing device. The alarm management system 100 also includes user devices. The user devices may be connected to the apparatus 104 and/or the one or more alarm systems 106A-N. Such connections between the user devices and the one or more alarm systems 106A-N may be wired or wireless. The alarm management system 100 may be based in a technical installation 107 such as manufacturing facility, power plant, etc. The apparatus 104 is capable of communicating with the cloud platform 102 via communication links 118 via the Internet.

Also, in the technical installation 107, the one or more alarm systems 106A-N may be connected to devices/assets 122A-N in the technical installation 107 which cannot directly communicate with the cloud platform 102. As shown in FIG. 1, the alarm systems 106A-N are connected to assets 122A-N, via wired or wireless network. For example, the assets 122A-N may be robots, sensors, actuators, machines, robots, or other field devices. Each of the alarm systems 106A-N is configured for communicating with the edge computing device 104 via communication interfaces. The alarm systems 106A-N may have an operating system and at least one software program for generating alarms in the technical installation 107.

Figure 7:
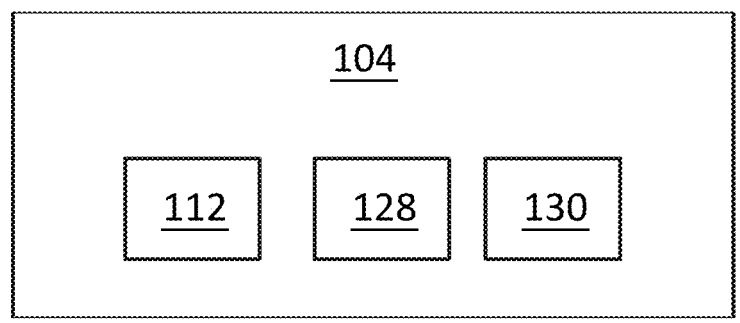
FIG. 7 is a schematic representation of an edge computing device, according to an embodiment.
Figure 8:
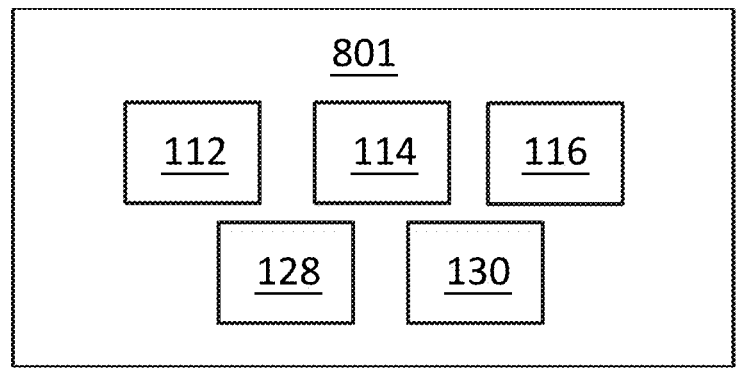
FIG. 8 is a schematic representation of a fog computing device, according to an embodiment.

The cloud platform 102 may be a cloud infrastructure capable of providing cloud-based services such data storage services, data analytics services, data visualization services, etc. based on the plant data. The cloud platform 102 may be part of public cloud or a private cloud. The cloud platform 102 may enable data scientists/software vendors to provide software applications/firmware as a service, thereby eliminating a need for software maintenance, upgrading, and backup by the users. The software application may be full application, or software patch. As shown in FIG. 1, the cloud platform 102 includes an alarm management module 112, an alarm management database 114, a network interface 116, a proxy 130, and a container object 128 associated with the alarm systems 106A-N. In an embodiment, the apparatus 104 may be an edge computing device 104. As illustrated in FIG. 7, the alarm management module 112, the proxy 130, and the container object 128 associated with the alarm systems 106A-N may be located in the edge computing device 104. Therefore, the edge computing device 104 performs the functions of managing the alarms in the technical installation 107. In yet another embodiment, the alarm management system 100 may include a fog computing device for management of alarms. As illustrated in FIG. 8, the alarm management system 100 includes a fog computing device 801 communicatively coupled to the cloud platform 102 and the apparatus 104. The fog computing device 801 includes the alarm management module 112, the proxy 130 and the container object 128 associated with the alarm systems 106A-N, the alarm management database 114 and the network interface 116.

Figure 2:
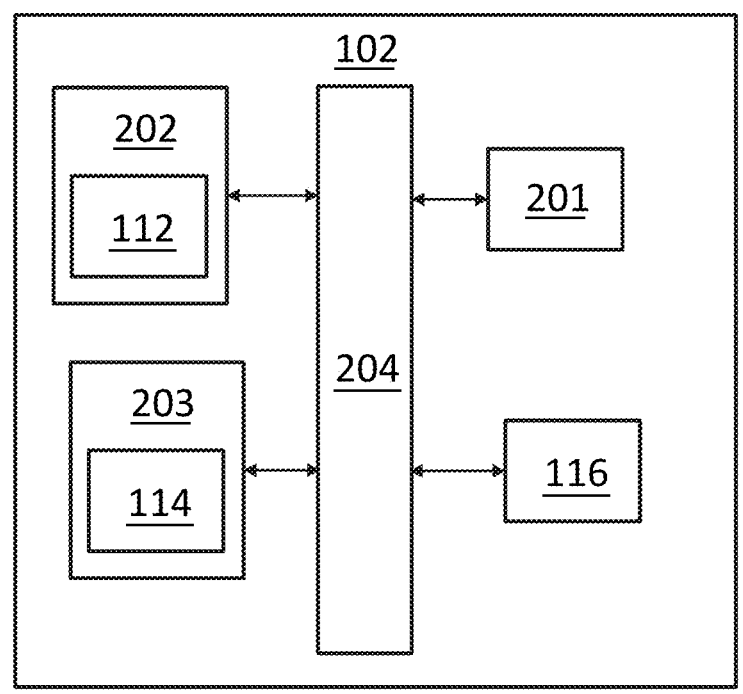
FIG. 2 is a block diagram of a cloud platform as shown in FIG. 1, according to the embodiment.

The cloud platform 102 is further illustrated in greater detail in FIG. 2. Referring to FIG. 2, the cloud platform includes a processing unit 201, a memory 202, a storage unit 203, a network interface 116, and a standard interface or bus 204. The cloud platform 102 may be an exemplary embodiment of a system. The system 102 may be a (personal) computer, a workstation, a virtual machine running on host hardware, a microcontroller, or an integrated circuit. As an alternative, the system 102 may be a real or a virtual group of computers (the technical term for a real group of computers is "cluster", the technical term for a virtual group of computers is "cloud").

The processing unit 201, as used herein, refers to any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 201 may also include embedded controllers, such as generic or programmable logic devices or arrays, application specific integrated circuits, single-chip computers, and the like. The processing unit 201 may include hardware elements and software elements. The processing unit 201 may be configured for multithreading, e.g., the processing unit 201 may host different calculation processes at the same time, executing the either in parallel or switching between active and passive calculation processes.

The memory 202 may be volatile memory and non-volatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes an alarm management module 112 stored in the form of machine-readable instructions on any of the above-mentioned storage media and may be in communication to and executed by processing unit 201. When executed by the processing unit 201, the alarm management module 112 causes the processing unit 201 to manage alarms associated with the assets 122A-N in the plant 107. The alarm management module 112 may further cause the processing unit to invoke a proxy of the faulty alarm system to configure a virtual alarm system. The alarm management module 112 may further cause the processing unit to identify an alternative alarm system to generate alarms for the assets 122A-N if a fault is identified in one of the alarm systems. Method acts executed by the processing unit 201 to achieve the abovementioned functionality are elaborated upon in detail in FIGS. 4, 5, and 6.

The storage unit 203 may be a non-transitory storage medium which stores an alarm management database 114. The alarm management database 114 may store one or more event data associated with the assets 122A-N. The bus 204 acts as interconnect between the processing unit 201, the memory 202, the storage unit 203, and the network interface 116.

Those of ordinary skill in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The present disclosure is not limited to a particular computer system platform, processing unit, operating system, or network. One or more aspects of the present disclosure may be distributed among one or more computer systems, (e.g., servers configured to provide one or more services to one or more client computers), or to perform a complete task in a distributed system. For example, one or more aspects of the present disclosure may be performed on a client-server system that includes components distributed among one or more server systems that perform multiple functions according to various embodiments. These components may include executable, intermediate, or interpreted code, which communicate over a network using a communication protocol. The present disclosure is not limited to be executable on any particular system or group of systems, and is not limited to any particular distributed architecture, network, or communication protocol.

Disclosed embodiments provide systems and methods for managing alarms. In particular, the systems and methods may identify an alternative alarm system for generation of alarms if a fault is identified in one of the alarm systems.

Figure 3:
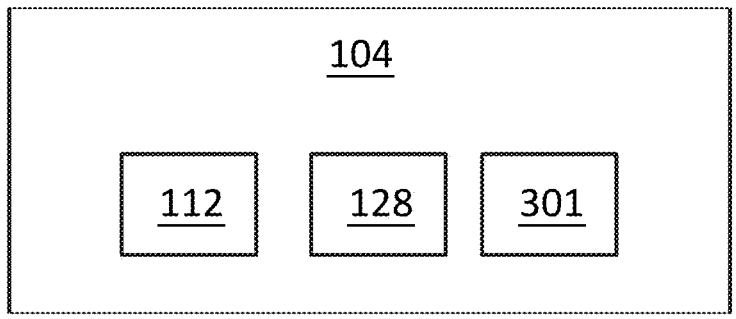
FIG. 3 is a block diagram of an apparatus as shown in FIG. 1, according to the embodiment.

FIG. 3 illustrates an embodiment of an apparatus 104 configured to manage alarms, according to an embodiment. The apparatus 104 is a device which controls data flow between two networks. The apparatus 104 may be a cloud computing-based device, an edge computing device, or a fog computing-based device. In an embodiment, the apparatus 104 is an edge computing device 104. The edge computing device 104 may be responsible for transmission, routing, processing, monitoring and storage of data passing between networks. The edge computing device 104 includes an edge operating system. The edge operating system enables efficient functioning of the edge computing device 104 by managing the hardware and software resources of the edge computing device. The edge computing device 104 further includes the alarm management module 112 and a proxy 301. In an embodiment, the alarm management module 112 is configured to manage alarms in the technical installation 107. The edge computing device 104 also includes a container 128 associated with the one or more alarm systems 106A-N. In an embodiment, the container 128 includes one or more alarm conditions associated with the one or more devices 122A-N. The alarm conditions define one or more criteria based on which an alarm may be generated for the one or more devices 122A-N. The edge computing device 104 is configured to monitor the one or more alarm systems 106A-N in the technical installation 107 and provide efficient functioning of the alarm systems 106A-N. In an embodiment, user devices may subscribe to the edge computing device 104 so as to receive status updates of the one or more devices 122A-N and/or the one or more alarm systems 106A-N. The edge computing device 104 is configured to identify an alternative alarm system in case one of the one or more alarm systems 106A-N fails due to a fault. Alternatively, if the alternative alarm system is not identified, a virtual alarm system may be configured in the edge computing device 104 which may generate alarms for the one or more devices associated with the faulty alarm system. The method acts of generating an alarm by the virtual alarm system are elaborated upon in detail in FIGS. 4 and 5.

Figure 4:
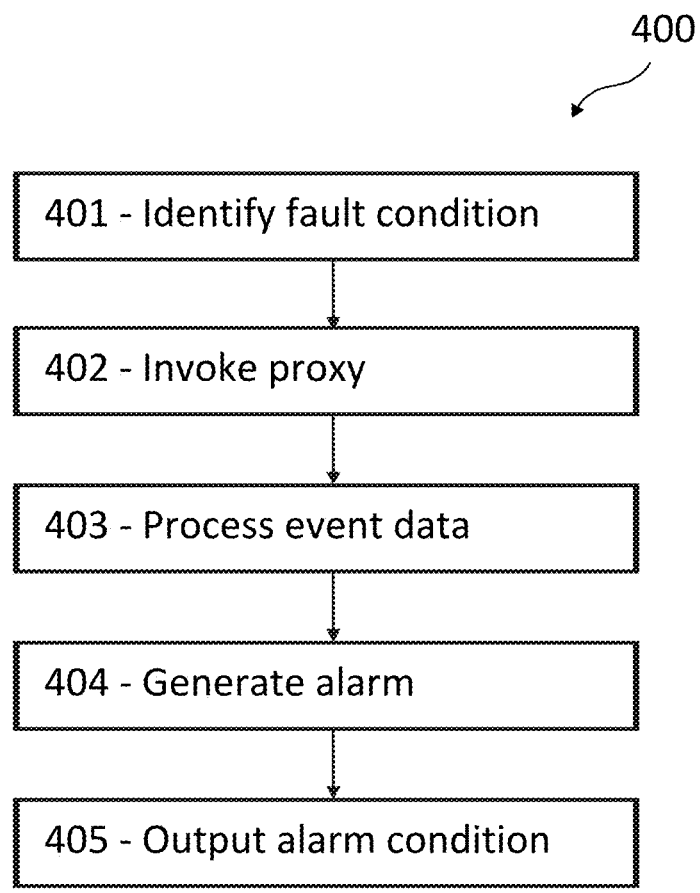
FIG. 4 illustrates a flowchart of a method of managing alarms, according to an embodiment.

FIG. 4 illustrates a flowchart of a method 400 of managing an alarm associated with one or more events in the technical installation 107. At act 401, a fault condition associated with one of a plurality of the alarms systems 106A-N is identified. The fault condition may be the unavailability of or disconnection from a network, wherein the network is provided for the functioning of the alarm systems 106A-N. Alternatively, the alarm system 106A-N may be faulty if the device 122A-N associated with the alarm system 106A-N malfunctions. At act 402, a proxy 130 of the faulty alarm system 106A is invoked based on the detected fault condition. A proxy is an object which when executed performs a defined operation. The proxy may virtualize a target object. In an embodiment, the proxy 130 is in the edge computing device 104 and is invoked when a fault is identified in an alarm system of the plurality of the alarm systems 106A-N. The proxy 130, when invoked, is configured to perform the functions of the faulty alarm system 106A when there is a fault condition. In an embodiment, the proxy 130 is a virtual alarm system. When the proxy 130 of the faulty alarm system 106A is invoked, an instance of a virtual alarm system is created in the edge computing device 104. The container object 128 including configuration data associated with the faulty alarm system 106A is executed to configure the instance of the virtual alarm system. In an embodiment, multiple instances of the virtual alarm system may be created if multiple fault conditions are detected in the technical installation 107. The containers associated with the alarm systems 106A-N include one or more alarm conditions. Such alarm conditions may be associated with the one or more devices 122A-N coupled to the alarm systems 106A-N. An alarm condition is a criterion for generation of an alarm. If the criterion is met, the alarm is generated. For example, if the device 122A has to be maintained within a temperature range of 20 degree Celsius to 30 degree Celsius, the alarm condition for the device is an event when the temperature of the device 122A is greater than 30 degree Celsius or below 20 degree Celsius. The edge computing device 104 is configured to receive from the plurality of the alarm systems 106A-N the corresponding alarm conditions. The edge computing device 104 may also be configured to receive from the devices 122A-N one or more event logs associated with the functioning of the devices 122A-N. Such alarm conditions are included in the container 128 associated with the alarm systems 106A-N. When an alarm system of the plurality of the alarm systems 106A-N is identified to be faulty, the container 128 in the edge computing device 104 is executed to configure the virtual alarm system. At act 403, event data associated with the event in the technical installation is processed by the virtual alarm system. The event data may be one or more parameter values associated with one or more parameters relevant for the detected event. The parameters may be temperature, pressure, fluid level, etc. In case of an abnormality, a deviation may be observed in the parameter values with respect to a standard value. Such standard values may be pre-defined threshold values for each parameter. Such parameter values are processed so as to identify a deviation with respect to the standard. The alarm conditions may also include pre-defined threshold values for the parameters. The pre-defined threshold values are the optimum values or optimum range of values within which the parameter values may lie. The method acts for processing event data are described in detail in FIG. 5. At act 404, at least one alarm is generated by the virtual alarm system based on the processing of the event, in the technical installation 107. The at least one alarm may be generated if a deviation is identified. The generated alarm may be a visual indication in the form of a notification. Such notification may be displayed on the user device associated with the user of the technical installation 107. Alternatively, the alarm may also be sound based. At act 405, an alarm condition is outputted on the device associated with the user of the technical installation 107. Alternatively, the alarm condition may be outputted on a device located in a control room in the technical installation 107. Such control room may be a room where the events of the technical installation 107 are monitored and recorded in real-time.

Figure 5:
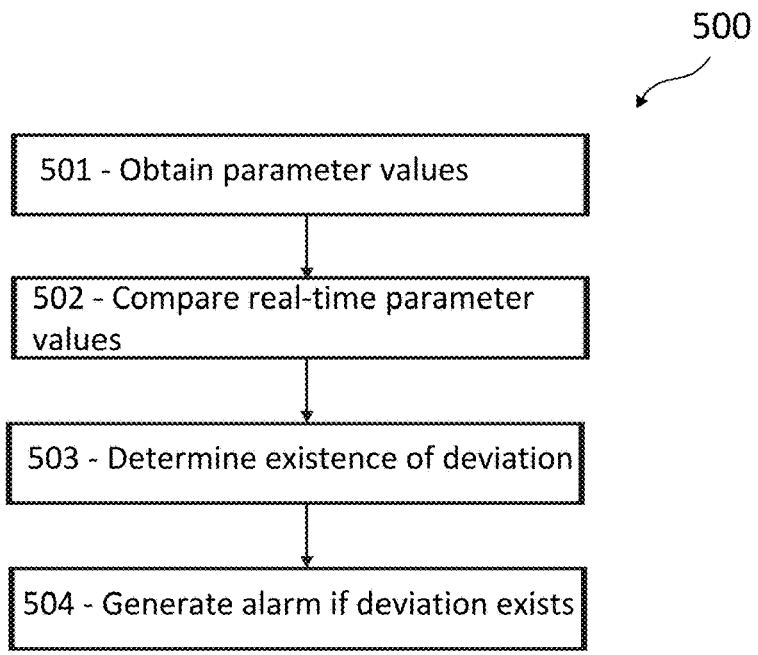
FIG. 5 illustrates a flowchart of a method of processing the event data associated with the event, according to an embodiment.

FIG. 5 illustrates a flowchart of a method 500 of processing the event data associated with the event in the technical installation 107. At act 501, one or more parameter values associated with the one or more devices 122A-N are obtained from the one or more sensors. Such sensors may be coupled to the one or more devices 122A-N and are configured to capture the parameter values associated with such one or more devices 122A-N. Such parameter values are captured in real-time. Therefore, determination of the condition of the devices 122A-N in real-time is enabled. At act 502, the real-time parameter values are compared with the pre-defined threshold values to determine if there is a deviation. A deviation may exist if there is a difference between the real-time parameter values and the pre-defined threshold values. At act 503, determination of existence of a deviation between the parameter values and the pre-defined threshold values is made. If a deviation exists, at least one alarm is generated at act 504. In an embodiment, the generated alarm and the alarm conditions may be broadcasted to the device 110A-N associated with the user of the technical installation 107.

Figure 6:
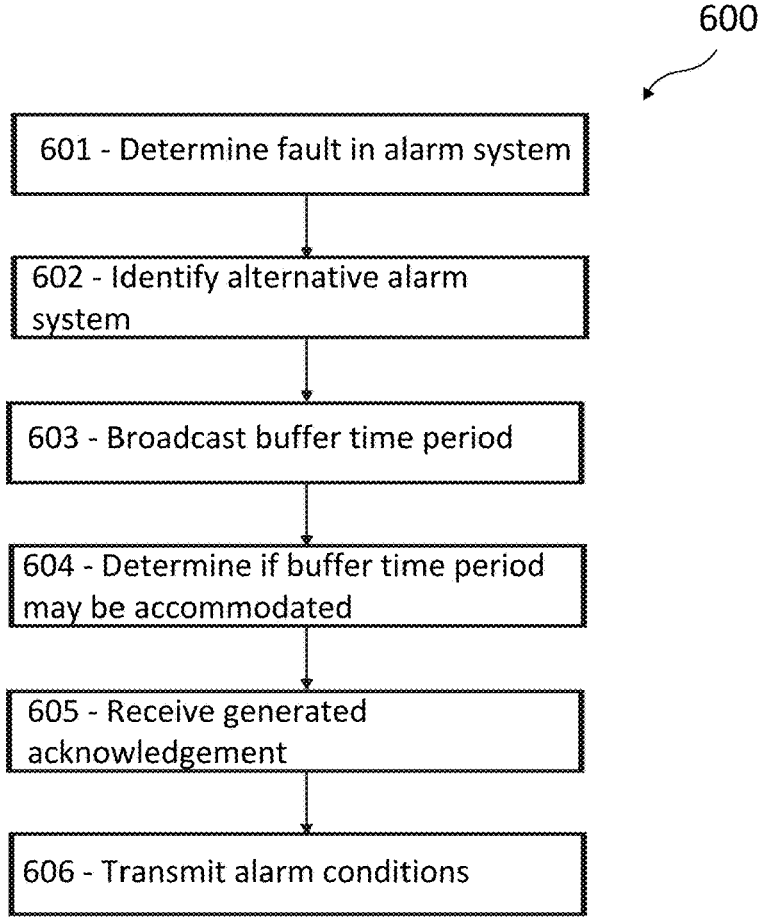
FIG. 6 illustrates a flowchart of a method of determining the alternative alarm system based on the bandwidth of the one or more alarm systems, according to an embodiment.

FIG. 6 illustrates a flowchart of a method 600 of managing alarms, according to another embodiment. At act 601, a fault is determined in an alarm system of the plurality of alarm systems 106A-N. The one or more alarm systems 106A-N are connected to the edge computing device 104. The edge computing device 104 constantly monitors the alarm systems 106A-N to check the functioning of the alarm systems 106A-N. The one or more alarm systems 106A-N is configured to generate notifications at regular intervals of time and transmit such notifications to the edge computing device 104 upon generation. The notifications from the alarm systems 106A-N act as an indication of the efficient functioning of the alarm systems 106A-N. If one of the alarm systems 106A of the plurality of the alarm systems 106A-N fails to generate and transmit a notification to the edge computing device 104 after the lapse of a first pre-defined interval of time, the edge computing device 104 identifies the absence of the receipt of such notification from such alarm system 106A. The edge computing device 104 waits for a second pre-defined interval of time to receive a notification from the one or more devices 122A-N associated with such alarm system 106A. In an event of absence of receipt of notification from the one or more devices 122A-N when the second pre-defined interval lapses, the edge computing device 104 identifies a fault condition in such alarm system 106A. In an embodiment, a notification of such fault in the faulty alarm system 106A may be generated by the edge computing device 104. Such notification may be transmitted to the one or more user devices 110A connected to the faulty alarm system 106A. Therefore, such user device 110A, on receipt of such notification, may connect to the edge computing device 104 to receive status updates on the alarm conditions of the one or more devices 122A-N associated with the faulty alarm system 106A.

At act 602 of the method 600, an alternative alarm system is identified from the plurality of the alarm systems 106B-N based on one or more parameters associated with such alarm systems 106B-N. The one or parameters may be, but not limited to, the assets 122A-N to which such alarm systems may be associated, and a bandwidth of the one or more alarm systems 106B-N to accommodate the alarm conditions of the faulty alarm system 106A. At act 603 of method 600, a buffer time period associated with each of the alarm conditions of the faulty alarm system 106A is broadcasted to the one or more other alarm systems 106B-N. Broadcasting the buffer time period enables determination of the memory required in the alternative alarm system to accommodate the alarm conditions associated with the faulty alarm system. The bandwidth of the alarm systems 106B-N is analyzed to determine if the alarm conditions associated with the faulty alarm system may be accommodated by such alternative alarm system 106B-N. Each alarm system of the plurality of the alarm systems 106A-N have one or more alarm conditions to be monitored. Each alarm system 106A-N has a pre-defined alarm bandwidth. Each alarm condition may occupy a slot in the pre-defined alarm bandwidth of the alarm system 106A-N. Therefore, each alarm system 106A-N may have a finite number of buffer slots which may be used to accommodate the alarm conditions of the faulty alarm system 106A. At act 604, the plurality of the alarm systems 106B-N determine if the buffer time period may be accommodated in the pre-defined alarm bandwidth. If the buffer time period may be accommodated by at least one alarm system of the plurality of the alarm systems 106B-N, an acknowledgement is generated by such at least one alarm system 106B-N. Such at least one alarm system 106B-N is identified as the alternative alarm system for the faulty alarm system 106A. At act 605, the generated acknowledgement is received by the edge computing device 104. At act 606, the alarm conditions associated with the faulty alarm system 106A are transmitted to the alternative alarm system 106B-N for generation of at least one alarm, if the alarm conditions are met.

In an embodiment, the virtual alarm system is configured in the edge computing device 104 when an alternative alarm system cannot be identified. The alternative alarm system may not be identified, for example, if the other one or more alarm systems 106B-N are unable to accommodate the alarm conditions associated with the faulty alarm system. Alternatively, the alternative alarm system may not be identified if the one or more parameters associated with the alarm systems 106B-A do not match with the parameters of the faulty alarm system 106A. Such mismatch may occur, for example, if the devices associated with the faulty alarm system 106A and the other alarm systems 106B-N are unrelated. In an embodiment, the edge computing device 104 may store all the alarms generated by the one or more alarm systems 106A-N in the alarm management database 114. Such data may be used to perform analytics of the alarms. The analysis may enable efficient maintenance of the plant 107.

The foregoing examples have been provided merely for the purpose of explanation and are in no way to be construed as limiting of the present disclosure disclosed herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosure in its aspects.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description.

The invention claimed is:

1. A method of managing alarms, the method comprising:
    determining, by an apparatus, a fault in an alarm system of a plurality of alarm systems, wherein the faulty alarm system of the plurality of the alarm systems is connected to one or more devices and is configured to generate an alarm for the one or more devices connected to the faulty alarm system of the plurality of the alarm systems based on alarm conditions defining one or more criteria based on which an alarm is generated for the one or more devices, and wherein the apparatus and the plurality of alarm systems is part of an alarm management system;
    identifying an alternative alarm system to generate an alarm for the one or more devices based on the alarm conditions, wherein the identifying is based on one or more parameters associated with the plurality of alarm systems; and
    generating an alarm by the alternative alarm system for the one or more devices associated with the faulty alarm system,
    wherein the identifying of the alternative alarm system further comprises:
        broadcasting a buffer time period associated with each alarm condition of the alarm conditions of the faulty alarm system to the plurality of the alarm systems;
        determining, by each alarm system of the plurality of the alarm systems, if the buffer time period can be accommodated in a pre-defined alarm bandwidth;
        receiving an acknowledgement from one or more alarm systems from the plurality of alarm systems configured to accommodate the buffer time period; and
        determining the alternative alarm system based on the acknowledgment.

2. The method of claim 1, wherein the criteria of the alarm conditions based on which an alarm is generated for the one or more devices are associated with one or more events at the one or more devices, and
    wherein the determining of the fault in the faulty alarm system of the plurality of alarm systems comprises:
        invoking a proxy of the faulty alarm system upon detecting the fault, wherein the proxy is configured to perform functions of the faulty alarm system;
        processing, by the proxy, event data associated with the one or more events at the one or more devices;
        generating at least one alarm by the proxy based on the processing of the event data; and
        outputting, by an alarm management module of the apparatus, an alarm on a device associated with a user of a technical installation.

3. The method of claim 2, wherein the invoking of the proxy of the faulty alarm system comprises:
    creating an instance of a virtual alarm system using the proxy when the fault condition is detected; and
    configuring the instance of the virtual alarm system by executing a container object comprising configuration data associated with the faulty alarm system.

4. The method of claim 3, wherein in processing the event data associated with the one or more events, the method comprises:

determining one or more alarm conditions of the one or more devices connected with the faulty alarm system;
receiving, from one or more sensors, the one or more parameter values associated with the one or more devices;
determining if the alarm conditions are met for generation of alarm based on the one or more parameter values; and generating the alarm if the alarm conditions are met.

5. The method of claim 4, wherein in determining the fault, by the apparatus, in the faulty alarm system of the plurality of alarm systems, the method comprises:
identifying an event of absence of a first notification from the faulty alarm system of the plurality of alarm systems when a first pre-defined interval is lapsed, wherein the faulty alarm system of the plurality of alarm systems is configured to generate a first notification, and wherein the faulty alarm system of the plurality of alarm systems is configured to transmit the first notification to the apparatus at the first pre-defined interval; and
identifying an event of absence of a second notification from the one or more devices associated with the faulty alarm system of the plurality of alarm systems when a second pre-defined interval is lapsed, wherein the one or more devices are configured to generate a second notification, and wherein the one or more devices are configured to transmit the second notification to the apparatus at the second pre-defined interval.

6. The method of claim 2, wherein in processing the event data associated with the one or more events, the method comprises:
determining one or more alarm conditions of the one or more devices connected with the faulty alarm system;
receiving, from one or more sensors, the one or more parameter values associated with the one or more devices;
determining if the alarm conditions are met for generation of alarm based on the one or more parameter values; and generating the alarm if the alarm conditions are met.

7. The method of claim 6, wherein in determining the fault, by the apparatus, in the faulty alarm system of the plurality of alarm systems, the method comprises:
identifying an event of absence of a first notification from the faulty alarm system of the plurality of alarm systems when a first pre-defined interval is lapsed, wherein the faulty alarm system of the plurality of alarm systems is configured to generate a first notification, and wherein the faulty alarm system of the plurality of alarm systems is configured to transmit the first notification to the apparatus at the first pre-defined interval; and
identifying an event of absence of a second notification from the one or more devices associated with the faulty alarm system of the plurality of alarm systems when a second pre-defined interval is lapsed, wherein the one or more devices are configured to generate a second notification, and wherein the one or more devices are configured to transmit the second notification to the apparatus at the second pre-defined interval.

8. The method of claim 2, wherein in determining the fault, by the apparatus, in the faulty alarm system of the plurality of alarm systems, the method comprises:
identifying an event of absence of a first notification from the faulty alarm system of the plurality of alarm systems when a first pre-defined interval is lapsed, wherein the faulty alarm system of the plurality of alarm systems is configured to generate a first notification, and wherein the faulty alarm system of the plurality of alarm systems is configured to transmit the first notification to the apparatus at the first pre-defined interval; and
identifying an event of absence of a second notification from the one or more devices associated with the faulty alarm system of the plurality of alarm systems when a second pre-defined interval is lapsed, wherein the one or more devices are configured to generate a second notification, and wherein the one or more devices are configured to transmit the second notification to the apparatus at the second pre-defined interval.

9. An apparatus for managing alarms in a technical installation, the apparatus comprising:
one or more processing units;
a memory coupled to the one or more processing units, wherein the memory comprises an alarm database, an alarm management module, a proxy, and a container object;
wherein the memory and the one or more processing units are configured to:
determine a fault in an alarm system of a plurality of alarm systems, wherein the faulty alarm system of the plurality of the alarm systems is connected to one or more devices and is configured to generate an alarm for the one or more devices connected to the faulty alarm system of the plurality of the alarm systems based on alarm conditions defining one or more criteria based on which an alarm is generated for the one or more devices, and wherein the apparatus and the plurality of alarm systems is part of an alarm management system;
identify an alternative alarm system to generate an alarm for the one or more devices based on the alarm conditions, wherein the identifying is based on one or more parameters associated with the plurality of alarm systems; and
generate an alarm by the alternative alarm system for the one or more devices associated with the faulty alarm system,
wherein the identification of the alternative alarm system further comprises: a broadcast of a buffer time period associated with each alarm condition of the alarm conditions of the faulty alarm system to the plurality of the alarm systems; a determination, by each alarm system of the plurality of the alarm systems, if the buffer time period can be accommodated in a pre-defined alarm bandwidth; receipt an acknowledgement from one or more alarm systems from the plurality of alarm systems configured to accommodate the buffer time period; and a determination of the alternative alarm system based on the acknowledgment.

10. The apparatus of claim 9, wherein the apparatus is an edge computing device.

11. The apparatus of claim 9, wherein the apparatus is a cloud computing-based device.

12. The apparatus of claim 9, wherein the apparatus is a fog computing device.

13. A system for managing alarms, the system comprising:
an apparatus;
one or more alarm systems communicatively coupled to the apparatus;

one or more devices associated with the one or more alarm systems;
one or more sensors associated with the one or more devices communicatively coupled to the apparatus; and
one or more user devices communicatively coupled to the apparatus,
wherein the apparatus comprises one or more processing units and a memory coupled to the one or more processing units, wherein the memory comprises an alarm database, an alarm management module, a proxy, and a container object;
wherein the memory and the one or more processing units of the apparatus are configured to:
determine a fault in an alarm system of the one or more alarm systems, wherein the faulty alarm system of the one or more alarm systems is connected to the one or more devices associated with the one or more alarm systems, wherein the faulty alarm system is configured to generate an alarm for the one or more devices connected to the faulty alarm system of the one or more alarm systems based on alarm conditions defining one or more criteria based on which an alarm is generated for the one or more devices, and wherein the apparatus and the one or more alarm systems is part of an alarm management system;
identify an alternative alarm system to generate an alarm for the one or more devices based on the alarm conditions, wherein the identifying is based on one or more parameters associated with the one or more alarm systems; and
generate an alarm by the alternative alarm system for the one or more devices associated with the faulty alarm system,
wherein the identification of the alternative alarm system further comprises: a broadcast of a buffer time period associated with each alarm condition of the alarm conditions of the faulty alarm system to the one or more alarm systems; a determination, by each alarm system of the one or more the alarm systems, if the buffer time period can be accommodated in a pre-defined alarm bandwidth; receipt an acknowledgement from at least one alarm system from the one or more alarm systems configured to accommodate the buffer time period; and a determination of the alternative alarm system based on the acknowledgment.

* * * * *